Jan. 10, 1967 H. L. HATHAWAY 3,297,990

CARRIER CURRENT REMOTE CONTROL HAVING MEANS FOR COMPENSATING FOR CHANNEL DELAY

Filed July 26, 1963 3 Sheets-Sheet 1

Jan. 10, 1967 H. L. HATHAWAY 3,297,990
CARRIER CURRENT REMOTE CONTROL HAVING MEANS FOR
COMPENSATING FOR CHANNEL DELAY
Filed July 26, 1963 3 Sheets-Sheet 2

INVENTOR.
Homer L. Hathaway
BY W. L. Stout
HIS ATTORNEY

United States Patent Office 3,297,990

Patented Jan. 10, 1967

3,297,990

CARRIER CURRENT REMOTE CONTROL HAVING MEANS FOR COMPENSATING FOR CHANNEL DELAY

Homer L. Hathaway, Penn Hills Township, Allegheny County, Pa., assignor to Westinghouse Air Brake Company, Swissvale, Pa., a corporation of Pennsylvania Filed July 26, 1963, Ser. No. 297,742

6 Claims. (Cl. 340—163)

Figure 1:
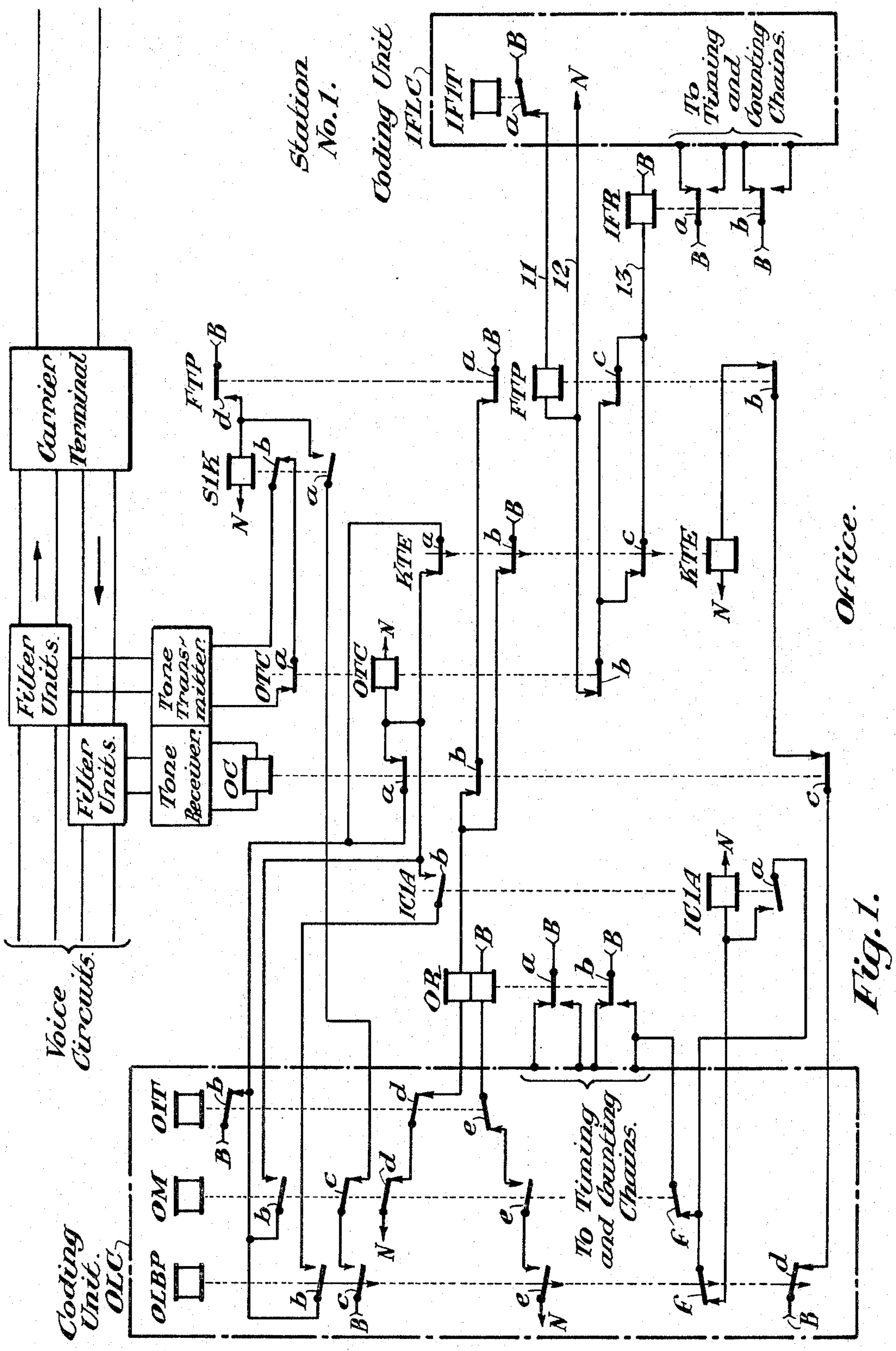

My invention relates to a carrier current remote control system. More particularly, my invention relates to an arrangement for compensating for transmission delay times resulting from the use of a carrier communication channel between the several locations of a remote control system using carrier current pulses for the transmission of the various functions.

The use and operation of remote control systems is well known in the communication arts. One common type of remote control system is the time code control system in which specifically timed pulses of current and periods of no current are used to carry intelligence between a control location and the various remote stations of the control system. Other types of code control systems are likewise well known. Various ones of remote control systems in actual service use carrier current circuits to provide the necessary communication channels between their stations. These carrier current channels may be operated on the well known simplex or duplex type of service. Where such carrier circuitry is used in multi-station remote control installations, it is common to provide what is known as a back-to-back terminal installation at each of the remote stations for the purpose of receiving and retransmitting the carrier current in each direction. The use of such terminals, together with the necessary filters to avoid mutual interference at each location, introduces into the communication channel various transmission delay periods. These delay periods are inherent in the operation of such carrier channels and must be accepted and compensation provided.

These delay times, of course, effect the operation of the code type remote control systems. This factor is especially true where some form of the so-called answer-back coding is normally utilized to assure synchronized operation of the system. In other words, the effect of transmission delay upon system operation is particularly noticeable where a form of answer-back code is used to lock out all stations other than the one in condition to transmit a code to the office. In such systems, synchronization may be lost throughout the system, especially when code transmissions are simultaneously initiated. Thus some means of compensation for the delay times is necessary for proper operation of such remote control systems over carrier current communication channels in order to assure the proper reception of the transmitted functions at the intended receiving location.

Accordingly, it is an object of my invention to provide an improved type of carrier current remote control system.

Another object of my invention is an improved arrangement to permit the operation of remote control systems over a carrier current communication channel.

A further object of my invention is the provision of means for compensating for the transmission delay times inherent in operating remote control systems over carrier current circuits.

Still another object of my invention is an arrangement which provides compensation for transmission delay periods occurring when code type remote control systems are operated over carrier current channels.

Another object of my invention is a circuit means which maintains the synchronization between the various stations of a coded carrier remote control system which is operating over a communication channel having considerable transmission delay time factors.

Yet another object of my invention is an arrangement which compensates for transmission delay times encountered during the operation of coded carrier remote control systems over duplex type communication channels.

Other objects, features, and advantages of my invention will become apparent from the following specification when taken in connection with the accompanying drawings.

In the accompanying drawings:

(a) FIG. 1 is a diagrammatic illustration, partly conventional in form, of the circuits at the control office location of a multi-station, code type, carrier current remote control system embodying one form of the arrangement of my invention.

Figure 2:
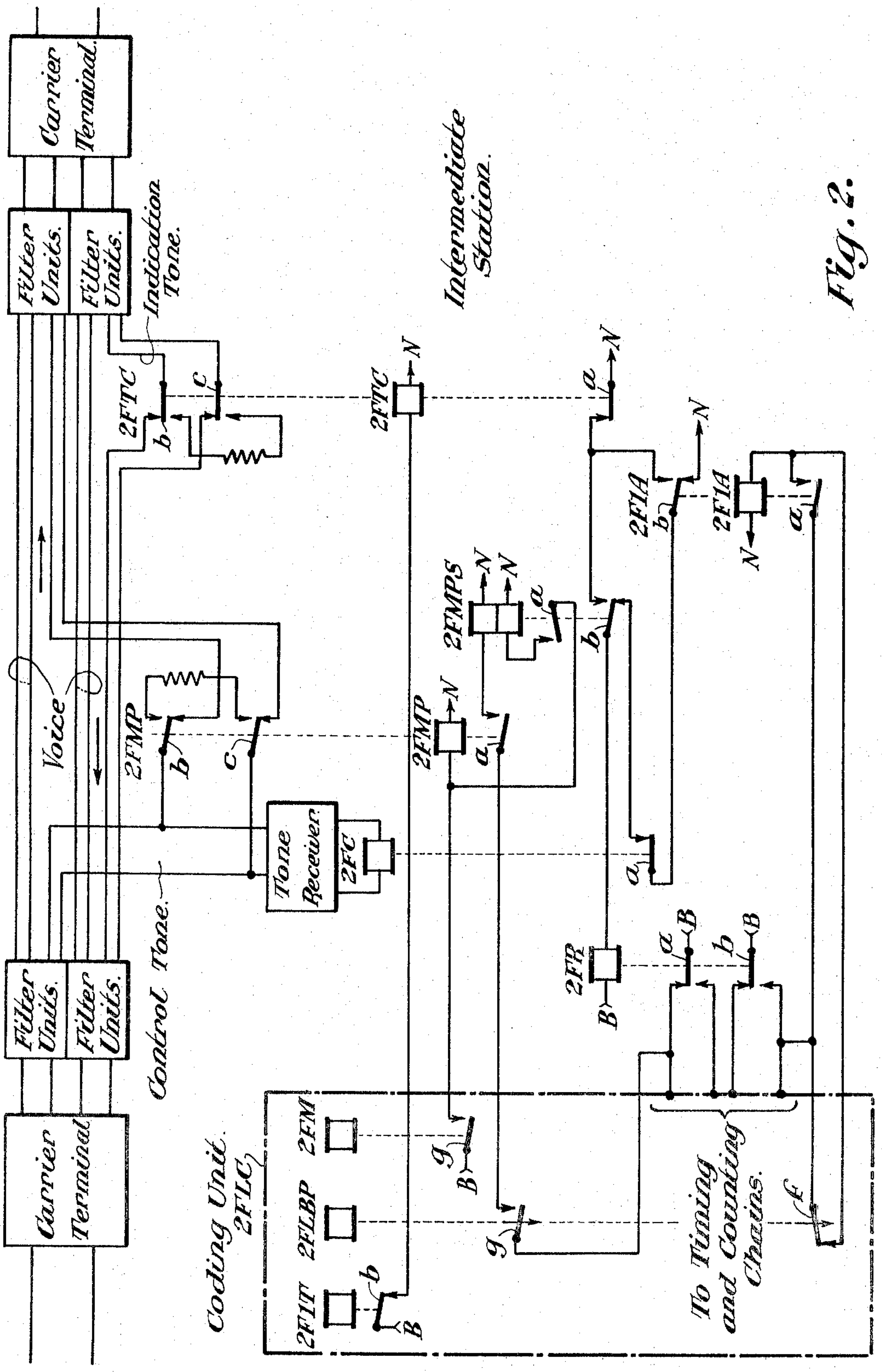

(b) FIG. 2 is a similar type illustration of the circuit arrangement embodying my invention at any one of the intermediate stations of the remote control system, this arrangement cooperating with the office circuits illustrated in FIG. 1.

Figure 3:
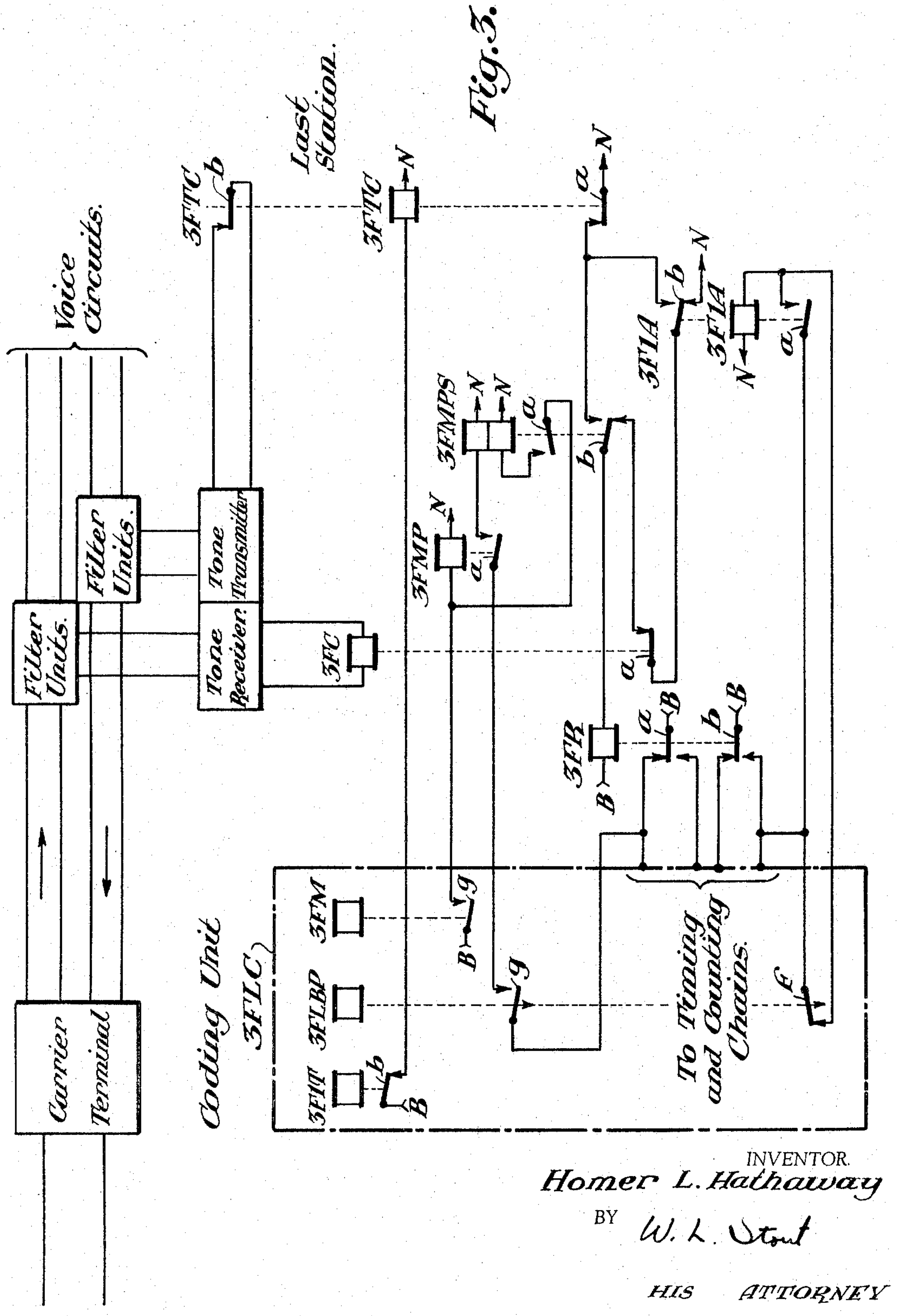

(c) FIG. 3 is a diagrammatic circuit drawing of the arrangement, embodying my invention, at the final station at the far end of the carrier circuit communication channel of the specific remote control system, other locations of which are shown in FIGS. 1 and 2.

In each of the drawings, similar reference characters refer to similar items of apparatus.

In practicing my invention, various changes are made, that is, variations from the normal or conventional, in the connections to the communication channel at the intermediate field stations in a control system using carrier current transmission circuits. As is illustrated in the drawings, the arrangement of my invention is applied to a basic type of coded communication system in which carrier current tones in the voice frequency range are transmitted as code pulses over a duplex type voice communication channel. The arrangement of my invention makes these changes in the channel connections at the intermediate stations because the major problem introduced by the transmission delays is in the transmission of indication codes from the remote stations to the office and/or in the synchronizing of simultaneously initiated codes. As will become apparent, the transmission of individual control codes from the control office to the various stations, when taken by themselves, presents no problems in spite of the fairly extensive transmission delay periods involved. At each of the intermediate stations, the connections to the communication channel are so arranged by my invention that the control tone circuit to the more distant station may be interrupted. The interruption occurs when the particular station apparatus initiates the transmission of an indication code to the office. The interruption of the control circuit to the more distant stations locks out the apparatus at these stations and sectionalizes the communication circuit.

Under the arrangement illustrated, the transmission of indication codes from a particular intermediately located station is accomplished by periodically interrupting the indication tone circuits so that the carrier current, generated at the most distant station, is interrupted in a specific code pattern. This code pattern, upon reception at the control office, is, of course, registered and interpreted in accordance with the basic operation of such systems. At the office location, my invention adds a time delay relay and another relay which is circuited to repeat the reception of the first indication code step from any field location. The time delay relay, actually shown as being of the slow release type, is actuated by the preliminary interruption of the indication carrier tone normally steadily received at the office location.

This timing relay delays the response of the office apparatus for its timing period, here its slow release period. At the expiration of this period, the office apparatus is actuated to receive this preliminary signal as the first code step from the field location. In addition, the timing relay actuates an interruption of the control tone as an answer-back to all stations. At a selected point in its response during the first indication code step, the office apparatus and the indication code first step repeater relay jointly restore the control tone as a second answer-back which indicates the end of the first step timing by the office coding unit.

At the station location, other relays are added to the station circuit arrangement which respond to the transmission of the preliminary signal which initiates the first indication code step. The circuits controlled by these additional relays are arranged to delay the completion of the first step action by the station coding unit at the active station or stations until after the first answer-back signal, the removal of the control tone, is received from the office. During the completion of the first step coding action, these added relays control various circuits to receive the second answer-back signal, the restoration of the control tone, transmitted at the end of the first step as timed by the office apparatus action. When the beginning of this second code step is received from the office, that is, the control tone is restored, the apparatus at the active field station, and only at this station, transfers the coding unit connections at that location so that the unit drives itself independently of any further answer-back from the office. This time delay period established by the office unit and the indication code first step relay at the office location allows the system to synchronize when simultaneous code starts occur. Preference over any indication code is given to a control code thus initiated. In the event of simultaneous indication codes, that station nearest the office which is in an active condition is given preference. As will be developed, this time delay period provided by the office relay must be equal to twice the transmission delay time in the communication channel between the first and the last station of this system, the transmission delay being doubled in order to provide for a round trip transmission of code steps.

I shall now describe the remote control system embodying my invention in specific detail, with reference to the accompanying drawings. I shall then point out the novel features thereof in the appended claims.

In the accompanying drawings, conventional symbols are used throughout in order to simplify the understanding of the arrangement. By way of explanation, each specific location is provided with a local source of direct current energy which supplies the various relays there located. This local source of direct current energy may be any one of several well known types and is here assumed, for convenience, to be a battery of proper size and capacity. However, the actual source at each location is not specifically shown but the positive and negative terminals thereof are designated by the reference characters B and N, respectively. It is to be understood that where these reference characters appear, a connection to the corresponding terminal of the direct current source is indicated. An appropriate source of energy (not shown) is also provided at each location for the various items of carrier apparatus. Where a slow release relay is intended, the relay winding is shown by the usual conventional symbol but the movable portion of each contact is marked with a downward pointing arrow to designate these slow release characteristics, such markings being conventional.

When the three figures of the drawings are placed adjacent in numerical order from left to right, there is illustrated a remote control system having an office location and two field or remote station locations. However, it will be obvious to those understanding the remote control art that additional intermediate stations, such as illustrated in FIG. 2, may be interposed in any reasonable number between the office location of FIG. 1 and the final station location of FIG. 3. The office and the various remote stations are connected by a carrier current communication channel which is here assumed to be of the duplex type. This channel is further assumed to carry a plurality of voice and other type carrier circuits in addition to the particular circuit used for the remote control system. This latter circuit is a two way arrangement assigned exclusively to the use of the remote control system. The various carrier terminals and filters necessary for operation of the communication channel are shown by conventional block diagram since such apparatus may be of various types, any of which are well known in the art and the operation understood. As previously mentioned, an appropriate power supply for all of this carrier apparatus is also assumed without further showing.

The remote control system upon which my invention is embodied is of the type using or transmitting pulses of carrier current tones, over the communication channel provided, in order to convey the desired intelligence in both directions between the office and the remote stations. In the terminology employed hereafter, control functions are transmitted from the office to the remote stations over the control tone circuit while transmissions from the stations to the office are known as indication functions or indication codes and are transmitted over an indication carrier tone circuit. These carrier tone circuits used by the remote control system extend from end to end of the stretch controlled by the system. Thus the control tone transmitter is located at the office location with a corresponding receiver at each station location connected in multiple across the control circuit. The transmitter for the indication carrier tone is located at the last station of the system, that is, in FIG. 3, and a single receiver is located at the office location. However, this indication circuit is controlled at each station by the code unit in a manner which will be explained fully hereinafter. Again, the tone transmitters and receivers are shown by conventional blocks since such apparatus is well known and its manner of connections to a duplex carrier channel understood. In fact, the same frequency may be selected for the carrier current tone in each direction since duplex operation is in effect. If desired, however, different frequencies may be used for each direction of transmission. Although not a necessity, it is here assumed that the frequency or frequencies used for the tone circuits are selected within the voice frequency range. Preferably, and herein assumed, each carrier tone is normally on, that is, is being transmitting from the transmitter to the various receivers for that direction. In keeping with this operation, an external keying circuit is shown for each transmitter which is normally closed to actuate the transmitter to generate the carrier current. It will be appreciated, however, that other types of operation are possible. For example, the transmitter keying circuits may be of a reverse nature, that is, normally open and shunting the carrier transmission when closed. The changes required in the various transmitter control circuits to provide such different operations will become obvious as the specification and description proceeds.

Referring now to FIG. 1, in which is shown the office location of the remote control system, the carrier terminals and filter apparatus have already been described. At the left of the drawing, by conventional dot-dash rectangle, is represented the office line coding unit OLC of the time code control system in use. This coding unit is shown conventionally since such apparatus is well known in the art. For example, the system used may be that shown in Letters Patent of the United States 2,698,425, issued to A. B. Miller on Dec. 28, 1954, for a Remote Control System. Reference is made to this prior patent for a complete showing of the apparatus and circuits within such an office line coding unit and for a better understanding of the operation of the complete system. It is to be understood, of course, that other specific types of remote control systems may be used, if desired, with corresponding modifications of the circuits in a manner well understood and in accordance with the type of system used.

In the present showing, only the control windings of three relays are shown within coding unit OLC, the bridging relay OLBP, the office master relay OM, and the office first transmitter relay O1T. No control circuits are shown for these relays since such are shown within the Miller patent to which reference may be had for an understanding of these circuits. Briefly, bridging repeater relay OLBP is part of the timing chain. It picks up during the first step of any coding action and thereafter remains picked up until the final step of that code. Master relay OM is energized to initiate a control code action by the office apparatus. Once energized, it remains picked up until the completion of the control coding. Transmitter relay O1T is alternately energized and deenergized during control coding action. This relay picks up to begin the odd numbered code steps, its timed release determining the length of such code steps. Release of the relay initiates each even numbered code step which is terminated when the relay again is energized and picks up. With this brief explanation of the operation of these relays, an understanding of the operation of the circuits embodying my invention is possible without further detailed discussion of the coding unit operation.

Also shown at the left of the drawing but outside of the coding unit is the office line relay OR. This relay also periodically picks up and releases during coding action. Its contacts *a* and *b* are thus moved between front and back positions so as to drive the timing and counting chains of coding unit OLC. This driving action is necessary to advance the code action from step to step either as the code is being transmitted from the office location or as it is being received as an indication code from the field locations. Such operation of the timing and counting chains in relation with the transmitter relay operation during control codes is fully explained in the aforementioned Miller patent. Since the operation here illustrated is over duplex carrier circuits on which are superimposed the carrier tone circuits carrying the actual functions, the circuitry for relay OR differs from that shown in the patent. However, the operation of this relay follows the same principles described, that is, it releases for the odd numbered code steps and picks up for the even numbered steps in driving the coding unit.

The lower winding of relay OR, as shown, is provided with a circuit which is similar to that shown in the patent. This circuit extends from terminal B of the battery through the lower winding of relay OR and over back contact *e* of relay O1T, front contact *e* of relay OM, and front contact *e* of relay OLBP to terminal N of the battery. As will appear later, this is the controlling circuit during the transmission of control codes from the office location. During such operation, the periodic opening and closing of contact *e* of relay O1T determines the operation of relay OR in driving the counting and timing chains of the unit. The upper winding of relay OR is provided with a first circuit extending from terminal B over front contact *a* of field transmitter repeater relay FTP, front contact *b* of office carrier receiver relay OC, the upper winding of relay OR, and back contacts *d* of relays O1T and OM to terminal N. A second circuit from terminal B over front contact *b* of the indication time element relay KTE is connected in multiple with the circuit over the front contacts of relays FTP and OC. This circuit network is effective to control relay OR during the reception of indication codes. Upon the initiation of an indication code, front contact *b* of relay KTE will open after a timing period and thereafter the operation of contact *b* of relay OC drives relay OR to follow the indication codes received over the indication tone circuit. It is obvious, of course, that a similar type operation of front contact *a* of relay FTP will likewise drive relay OR to follow a received code from a directly connected field station to be discussed later. The connection to terminal B over front contact *b* of relay KTE is for the purpose, as will appear hereinafter, of holding the office coding unit inactive for a selected period of time at the beginning of each indication code. The basic operation, however, is the driving of relay OR by the alternate opening and closing of contact *b* of relay OC, with the coding unit being driven by relay OR in keeping with the received code.

Control codes are transmitted in response to the operation of the office carrier transmitter relay OTC shown in the center of FIG. 1. Primarily, the operation of this relay keys the control tone transmitter so that the control carrier tone is pulsed over the communication channel to the plurality of remote stations. As previously described, the control tone is normally on, that is, is normally generated and transmitted over the communication channel. The keying circuit for the tone transmitter includes front contact *a* of relay OTC and back contact *b* of the first station indication relay S1K which will be described later in more detail. Relay OTC is normally energized and relay S1K normally deenergized so that the keying circuit is normally closed when the system is in its at-rest condition. Basically, relay OTC is a direct repeater of back contact *b* of relay O1T, one normal circuit including this back contact and front contact *a* of relay OC. It was previously described that, in the transmission of control codes, a code pattern is formed by the operation of relay O1T to alternately pick up and release on the odd and even numbered steps of the code, respectively. Depending upon the length of time that relay O1T is in its picked up or released condition during the coding action, long and short steps of the time code arrangement, here shown, are formed. Relay OTC follows this pattern in an obvious manner over the circuit just traced. That is, it releases on the odd numbered steps and picks up again on the even numbered steps, thus repeating the code pattern in keying the control tone carrier transmitter to transmit the control carrier pulses.

A plurality of alternate circuits are provided for the control of relay OTC under special conditions which will be described during the operational description of the system. A first alternate circuit is provided by front contact *a* of relay KTE which is in multiple with front contact *a* of relay OC. Since relay KTE is normally energized and its front contacts thus closed, relay OTC is initially held energized when relay OC releases. However, as will be developed later, relay KTE releases during any code operation so that this particular alternate circuit for relay OTC is of the nature of a temporary holding circuit. The second alternate circuit for relay OTC includes back contact *b* of relay O1T, as before, and front contact *b* of master relay OM. Since relay OM is energized and remains picked up during an entire control code, this alternate circuit becomes the controlling circuit during the transmission of a control code, as also will be described during the operational description. In other words, this alternate path assures that a circuit exists by which relay O1T may control relay OTC during the transmission of control codes, particularly if an indication code has been started simultaneously and until synchronization occurs. The final or third alternate circuit, which is effective during the first step of indication codes for timing purposes, includes the aforementioned back contact *b* of relay O1T, front contact *b* of relay OLBP, and front contact *b* of the indication code first step relay IC1A. This third alternate circuit serves to temporarily control the restoration of the control code tone to the channel, bridging the initiation of an indication code from any of the remote stations. However, the purpose of all of these alternate circuits for controlling relay OTC will appear in more detail during the operational description of this system which will follow after detailed circuits are established.

The indication time element relay KTE is involved in the timing prior to the initiation of the first answer-back pulse from the office to the various stations, this pulse being necessary in order to allow an indication code to continue beyond the first preliminary step. It may be said that this relay is thus involved in the synchronization of the system during coding action. Relay KTE is energized normally by a circuit from terminal B over back contact *d* of relay OLBP, front contact *c* of relay OC, front contact *b* of relay FTP, and the winding of relay KTE to terminal N. Relay KTE is, of course, provided with slow release characteristics as indicated by the standard symbol superimposed upon the movable portion of each of its contacts. It has been previously described that contacts *a* and *b* of this relay provide alternate circuits, respectively, for relays OTC and OR. Its front contact *c* is involved in the transmission of codes and synchronizing pulses to a specifically illustrated first station shown in the lower right of FIG. 1 which is controlled by direct wire circuits, which operation will be discussed later.

Another relay at the office, added by my invention, is the previously mentioned indication code first step relay IC1A. This relay is provided with an energizing circuit including back contact *b* of relay OR, back contact *f* of relay OM, back contact *f* of relay OLBP, and the winding of relay IC1A. A stick circuit for this relay includes the aforementioned back contacts of relays OR and OM, and front contact *a* and the winding of relay IC1A. Obviously, this relay is normally deenergized and in its released condition. It is energized and picks up to repeat the release of relay OR on the first step of an indication code, back contacts *f* of relays OM and OLBP being closed at the instant the code is initiated. The stick circuit then holds the relay energized until relay OR again picks up at the beginning of the second step of the code. Obviously, with back contact *f* of relay OM in the circuit, this relay is not energized during the transmission of the first step of a control code. Front contact *b* of relay IC1A is involved in the third alternate circuit previously traced for relay OTC where, as will be apparent from the operational description, it serves as part of the synchronizing action during the separation of codes simultaneously initiated.

The remaining relays shown in the office location are involved in the coding operation during the transmission of codes to or from a first station of the system, shown specifically in the lower right of FIG. 1. In order to provide a complete showing of a type installation of the arrangement of my invention, station No. 1 is assumed to be sufficiently close to the office location that it is expedient to control this station by direct wire circuits provided over the three line wires 11, 12, and 13. It is to be understood that, although this station is controlled by this three wire line circuit, it is part of the overall code system and its operation must be synchronized with the remaining remote stations which are controlled over the carrier communication channel. Station coding unit 1FLC, shown by conventional dot-dash rectangle, is located at station 1. Only the station first transmitter relay 1F1T is shown within this coding unit as its operation alone, of the unit relays, is sufficient for an understanding of the control of this particular station. Shown outside station coding unit 1FLC but also located at station No. 1 is the station line relay 1FR. It is to be understood that the apparatus at this station is similar to that at the remaining stations, a complete description and circuitry of which are provided in the aforementioned Miller patent.

Actually, the operation of relay 1F1T is similar to that of relay O1T at the office, the relay alternately picking up and releasing to provide a specific code pattern during the transmission of indication codes from this first station.

Station line relay 1FR, of course, receives codes from the office location and, through the code following action of its contacts *a* and *b* between their front and back positions, drives the timing and counting chains of unit 1FLC to receive and register the codes transmitted from the office location. This operation occurs not only when a control code is transmitted from the office, but when indication codes are received at the office from other locations, this latter action providing a synchronizing lockout arrangement necessary, for the proper operation of the system. The operation of relay 1F1T at this station is obviously repeated by the field transmitter repeater relay FTP at the office location, the circuit including back contact *a* of relay 1F1T and line wires 11 and 12. It is to be noted that energy for the operation of relay FTP is provided by the local source of energy at the station indicated by terminals B and N at that location. Relay 1FR is provided with a circuit traced from terminal B at the station location through the winding of relay 1FR over line wire 13, front contacts *c*, in multiple, of relays FTP and KTE at the office, front contact *b* of relay OTC, and line wire 12 to terminal N at the station location. It is obvious that relay 1FR at this first station will follow the coding action of front contact *b* of relay OTC. Under other conditions, and with front contact *c* of relay KTE open, relay 1FR follows the coding action of front contact *c* of relay FTP. Under this latter condition, of course, relay 1FR is actually repeating the code pattern established by back contact *a* of relay 1F1T in order to drive unit 1FLC to advance the coding action during the transmission of indication codes from the station. Such action is necessary in the type system here assumed and is fully described in the aforementioned Miller patent.

Reviewing briefly then, during control codes, relay 1FR at the first station location is controlled by the operation of relay OTC at the office. Station coding unit 1FLC thus receives all control codes and, if the station call portion of the code is proper, it receives and registers the control functions being transmitted. Otherwise, unit 1FLC is held nonactive and unable to initiate an indication code during the transmission of control codes to other stations. As will appear hereinafter, during the transmission of indication codes from stations connected over the communication channel itself, relay FTP is held energized and relay 1FR is controlled by the operation of front contact *b* of relay OTC in order to retain the coding unit at the first station locked-out from initiating an indication code. As mentioned, during the transmission of an indication code by the unit at the first station, relay FTP follows the received code pattern. Since relay KTE at the office releases during the initial portion of all codes, it is obvious that the operation of front contact *a* of relay FTP during this coding action will control the operation of relay OR in order to receive the code and drive coding unit OLC to register the code and the functions transmitted. The initial release of relay FTP on the first step of such indication codes closes, at its back contact *d*, the circuit for relay S1K which, thus energized, picks up. The closing of front contact *a* of relay S1K prepares a stick circuit for this relay which further includes back contact *c* of relay OM, which remains closed when indication codes are being received, and is finally completed at front contact *c* of relay OLBP at the end of the operation of the timing chain in office coding unit OLC. Relay S1K is thus held energized during the remainder of the indication code being transmitted from station No. 1. When back contact *b* of relay S1K opens, the keying circuit for the control tone transmitter is interrupted and this absence of tone transmitted over the main communication channel to the remaining stations holds such stations locked out during the transmission of this indication code from station 1.

I shall now consider the intermediate station arrangement such as shown in FIG. 2. At such intermediate stations, the carrier communication channel is provided with back-to-back carrier terminals for the duplex operation of the various carrier circuits transmitted over the basic communication channel. These units are provided so that the voice circuits and other carrier circuits, as well as the tone circuits being used by the remote control system, may be dropped into this station location for communication and various control purposes. Some of the carrier circuits being carried by the basic communication channel may be connected straight through between the back-to-back carrier terminals for transmission in each direction without any local control measures. Carrier repeaters are not necessary since the back-to-back terminals operate to provide this feature automatically. A carrier tone receiver for the control circuit of the remote control system is provided to receive the tone pulses. However, no receiver is necessary for the indication tone circuit and only a control arrangement providing for transmission of indication codes from this location is provided. It is to be remembered that, although the communication channel is of the duplex type so that transmission in each direction simultaneously is possible, each of the various carrier circuits involved, both for the remote control system and various voice circuits, is of a single direction nature only.

At the left of FIG. 2, shown by conventional dot-dash rectangle, the field coding unit 2FLC is provided as part of the remote control system. Obviously, this is similar to the coding unit used at the office location and at the other stations, the details of which are shown and described in the aforementioned Miller patent. Again, only three relays are shown within the conventional dot-dash rectangle, control windings only being shown, with no control circuits. A brief understanding of the operation of these relays is sufficient for a full understanding of the arrangement of my invention. The station first transmitter relay 2F1T controls the transmission of indication codes from this location. As in other coding units, previously described, this relay establishes the code pattern to be transmitted, this pattern being repeated by the operation of back contact *b* of this relay. The bridging repeater relay 2FLBP of the unit timing chain, as at the office location, picks up during the first step of any code at the end of the timing chain operation and remains energized, that is, remains in its picked up condition, during the entire coding action. Station master relay 2FM is energized to initiate the transmission of an indication code and remains energized and picked up during the transmission of such a code. This relay is not energized during the reception of a control code from the office location.

Master relay 2FM has a direct front contact repeater relay 2FMP controlled by front contact *g* of relay 2FM. Relay 2FMP is primarily for the purpose of providing extra contacts at this location repeating the operation of the master relay, this form being more convenient to show than to use contacts of relay 2FM itself. A station master relay stick repeater relay 2FMPS is also provided. The energizing circuit for this relay includes front contact *a* of the station line relay 2FR, front contact *g* of relay 2FLBP, front contact *a* of relay 2FMP, and the upper winding of relay 2FMPS. The stick circuit for this relay is completed over its own front contact *a* and lower winding and also includes front contact *g* of master relay 2FM. The two separate windings for relay 2FMPS are necessary in order to eliminate any sneak circuits which would adversely effect the operation of the apparatus.

A first code step relay 2F1A is provided at the station location and repeats, that is, is energized during, the first step of any coding action. The energizing circuit for this relay is traced from terminal B over back contact *b* of relay 2FR, back contact *f* of relay 2FLBP, and the winding of relay 2F1A to terminal N. This relay is provided with a stick circuit, which retains it energized until the beginning of the second code step, including back contact *b* of relay 2FR and front contact *a* and the winding of relay 2F1A. Code pulses from the office location are received at this intermediate station through the control tone receiver by carrier receiver relay 2FC. It is to be seen that the tone receiver is connected, in multiple, across the control tone carrier circuit which extends from the office to the most distant station. Relay 2FC is energized as long as carrier tone current is being received at this location. Thus, relay 2FC repeats the code pattern transmitted from the office location by relay OTC, as previously described.

Code pulses received and originating at this station are repeated by station line relay 2FR. This relay is normally energized over the circuit traced from terminal B through the winding of relay 2FR, back contact *b* of relay 2FMPS, front contact *a* of relay 2FC, and back contact *b* of relay 2F1A to terminal N. A first alternate circuit for relay 2FR includes front contact *b* of relay 2FMPS and front contact *a* of relay 2FTC. Obviously, when this circuit is effective, relay 2FR will repeat any code pattern established by the station carrier transmitter relay 2FTC. Another alternate circuit for relay 2FR includes back contact *b* of relay 2FMPS and front contact *a* of relay 2FC, as previously traced, thence, front contact *b* of relay 2F1A and front contact *a* of relay 2FTC. This circuit is effective during the first step of any coding action so that relay 2FR may be actuated by either relay 2FC or relay 2FTC. The operation of contacts *a* and *b* of relay 2FR drives coding unit 2FLC, that is, the timing and counting chains thereof, to receive and register code pulses, particularly control codes received from the office and, during the transmission of indication codes from this station, to advance the coding action of the unit in keeping with the usual operation of such systems.

Indication code transmission from this intermediate station is controlled by the operation of relay 2FTC. This relay is obviously a direct repeater of back contact *b* of relay 2F1T. Such codes are transmitted by interrupting the indication tone circuit which originates at the last station of the system, that is, the most distant station from the office. As was previously indicated, such a circuit is dropped through each intermediate station between the carrier terminals of the basic communication channel. Normally, this circuit is completed from the more distant stations towards the office location over front contacts *b* and *c* of relay 2FTC. However, when this latter relay is following the code pattern established by relay 2F1T, the indication tone circuit is alternately interrupted and completed. When interrupted, the circuit from the more distant station is terminated through a line balancing resister over back contacts *b* and *c* of relay 2FTC. Of course, at the time that indication codes are transmitted from this particular station, master relay 2FM is picked up and, likewise, its direct repeater relay 2FMP. The control tone circuit beyond the connections of the local tone receiver towards the more distant stations is controlled by contacts *b* and *c* of relay 2FMP. Normally, the control tone circuit is completed towards these distant stations over back contacts *b* and *c* of this relay. However, when relay 2FMP is energized and picked up, the control tone circuit is interrupted and is terminated in a line balancing resister over front contacts *b* and *c* of this relay. Thus the transmission of the control tone to the more distant stations is interrupted when an indication code transmission is initiated at any such intermediate station. This serves to lock out the more distant stations during this period of time to prevent the initiation of any coding action at such stations.

A typical final station arrangement is shown in FIG. 3. The carrier communication channel is terminated at this location in a carrier terminal, shown by a conventional block, with the necessary filters to separate the voice and other communication circuits from the carrier circuits assigned specifically to the remote control system. The voice circuits may terminate at this station or may be passed through another carrier terminal for continuation beyond to other stations or offices. The control tone carrier circuit is terminated at this location in a corresponding tone receiver which controls the station carrier receiver relay 3FC. As at other stations, relay 3FC is energized by the tone receiver when carrier current of the proper frequency is being received over the control circuit from the office location. The indication tone circuit is originated at this final station location by a carrier tone transmitter of the selected frequency. This tone transmitter, of any well known type, includes an oscillator or other form of frequency generator for the purposes of establishing the selected frequency of the carrier tone. This tone transmitter is normally active, generating the carrier tone and transmitting it over the communication channel, since its keying circuit is normally closed over front contact *b* of the station carrier transmitter relay 3FTC.

This final station is provided with a field line coding unit, shown conventionally and designated by the reference 3FLC. This coding unit is identical with that used at the intermediate station, previously described, and within the bounds of the conventional dot-dash rectangle are shown the same three relays necessary for an understanding of my invention. The relay references include the prefix 3 to distinguish from those shown at the intermediate station location and to designate that these are located on FIG. 3 at the final station. Again, relay 3FTC is a direct back contact repeater of the station transmitter relay 3F1T, being controlled over back contact *b* of this latter relay. Relay 3FTC thus follows in reverse order the code pattern established by relay 3F1T and in turn keys the indication tone transmitter to actuate the transmission of an indication code from this final station.

Relay 3FMP is a direct front contact repeater of relay 3FM, the energizing circuit being obvious from the drawing. A stick repeater relay 3FMPS repeats the closing of front contact *a* of relay 3FMP when front contacts *a* and *g* of relays 3FR and 3FLBP, respectively, are also closed. The stick circuit for relay 3FMPS includes as its own front contact *a* and front contact *g* of relay 3FM. Thus the operation of these two repeater relays is the same as the similar repeater relays shown at the intermediate stations, that is, once energized, each remains energized throughout the transmission of an indication code.

Station line relay 3FR acts, through its contacts *a* and *b* moving between their front and back positions in response to a code following action of relay 3FR, to drive the timing and counting chains of station coding unit 3FLC in the usual manner, both during the transmission of indication codes and during the reception of control codes. As at other stations, relay 3FR repeats the operation of relay 3FC during the reception of control codes and, during the transmission of indication codes, repeats the operation of relay 3FTC in order to advance the coding action in the coding unit. Relay 3FR is normally energized during the at-rest condition of the system over a circuit including back contact *b* of relay 3FMPS, front contact *a* of relay 3FC and back contact *b* of relay 3F1A. A second circuit for relay 3FR includes front contact *b* of relay 3FMPS and front contact *a* of relay 3FTC. The final circuit for relay 3FR includes back contact *b* of relay 3FMPS and front contact *a* of relay 3FC as originally traced and also front contact *b* of relay 3F1A and front contact *a* of relay 3FTC.

The remaining relay shown at this last station, the station first code step relay 3F1A, is normally deenergized and becomes energized during the first step of any code. The circuit is traced from terminal B over back contact *b* of relay 3FR, back contact *f* of relay 3FLBP, and the winding of relay 3F1A to terminal N. The stick circuit for this latter relay includes its own front contact *a* and back contact *b* of relay 3FR. Thus relay 3F1A picks up during the first step of any code when relay 3FR releases and is then held energized by its stick circuit until the end of the first code step, that is, until relay 3FR picks up to begin the second step of the code.

In describing the various conditions of operation to which the system must respond, I shall first describe the transmission of a control code from the office to a selected station at a time when there is no interference from any simultaneous or nearly simultaneous indication code. After the selection of the desired station and functions on the control panel by the system operator, the transmission of the control code is initiated by this operator which results in the energization and pick up of master relay OM within office coding unit OLC. The operation of unit OLC during the transmission of the complete code is described in detail in the previously mentioned Miller patent. It is sufficient to understand here that the code pattern is established by the operation of relay O1T and the coding action within the unit is advanced by a corresponding code following operation of relay OR. Relay OLBP picks up at the end of the timing chain action during the first step of this code.

When relay O1T initially picks up to start the first code step, the opening of its back contact *b* interrupts all possible circuits for carrier transmitter relay OTC and this latter relay, thus deenergized, releases. The opening of front contact *a* of relay OTC interrupts the keying circuit for the control tone transmitter and the transmission of this tone over the communication channel is halted. This results in the deenergization and release of the relays FC at the intermediate and final stations shown in FIGS. 2 and 3. The opening of front contact *a* of each of these relays interrupts the normal energizing circuit for the corresponding line relay FR and such relays also release. The opening of front contact *b* of relay OTC interrupts the direct line circuit including line wires 12 and 13 so that relay 1FR at station No. 1, shown in FIG. 1, is deenergized and releases.

When relay OLBP picks up at the end of the first code step, the opening of its back contact *d* interrupts the normal energizing circuit for time element relay KTE and this relay is thus deenergized and releases at the end of the expiration of its slow release period. However, the release of relay KTE under the existing conditions has no real significance, for each of the circuits controlled by its various front contacts is either nonactive when control codes are being transmitted or is bypassed by another contact. For example, with relay OM picked up, its front contact *b* establishes a direct circuit to the winding of relay OTC to place this relay under direct control of back contact *b* of relay O1T regardless of the condition of any of the alternate circuits for relay OTC. With back contact *d* of relay OM open and its front contact *e* closed, the circuits for the upper winding of relay OR are not effective and this relay is controlled entirely by the circuit for its lower winding which includes back contact *e* of relay O1T. The code following operation of relay OR is thus entirely responsive to the operation of back contact *e* of relay O1T. Front contact *c* of relay FTP remains closed during this code operation so that front contact *c* of relay KTE is bypassed and control of relay FR at station No. 1 is retained by front contact *b* of relay OTC.

At the various carrier stations such as shown in FIGS. 2 and 3, the relays FC follow the code transmitted over the control tone circuit from the office location. At each location, the code following operation of contact *a* of the corresponding relay FC drives the station line relay FR in a similar code pattern. In turn, relay FR, through its contacts *a* and *b*, drives the coding unit FLC at that station to receive and register the code. Although the relays F1A at each station pick up during the first code step and release at the beginning of the second code step, a connection to terminal N for the corresponding relay FR is maintained either over front contact *b* of the station F1A relay and front contact *a* of the corresponding FTC relay or, after the beginning of the second step, over back contact *b* of the station F1A relay. As previously mentioned, the code following operation of front contact *b* of relay OTC at the office drives the line relay 1FR at the first station and this latter relay in turn drives the station coding unit. Thus all the station units follow the transmitted control code, the desired station is selected and the transmitted control functions are registered and acted upon. The detailed operation for this is, of course, described in the Miller patent made of reference in this application.

I shall now consider the transmission of an indication code from the intermediate station such as shown in FIG. 2. Such an indication code is initiated independently as a result of a change in one of the functions at this station or as a result of the reception of a control code from the office directed to this particular station. As described in the Miller patent, the station start relay is picked up providing all conditions are proper for the initiation of a code. This results in the energization of relay 2FM if the system as a whole is at rest. The closing of front contact *g* of relay 2FM energizes its direct repeater relay 2FMP which picks up. The opening of back contacts *b* and *c* of this latter relay interrupts the control tone circuit to the more distant stations, substituting for the distant part of the carrier channel a line balancing resister connected over front contacts *b* and *c* in order to maintain the operation of the control tone circuit within a proper balance. In effect, this operation sectionalizes the line circuit, that is, the control tone circuit. With the control tone absent, relays FC at the more distant stations release and thus release the relays FR at the same stations so that coding units FLC are locked out in their reverse condition, in a manner explained in the Miller patent. Once this lock-out occurs, no indication codes can be initiated at such stations.

At the station shown in FIG. 2, relay 2F1T picks up to transmit the first step of the desired indication code. The opening of back contact *b* of relay 2F1T interrupts the obvious circuit for relay 2FTC which, thus deenergized, releases. The transfer of contacts *b* and *c* of relay 2FTC from their front to back position interrupts the indication tone circuit towards the office, substituting across the circuit line balancing resister which is an equivalent load to maintain an indication circuit balance and proper operation to this point from the most distant station. However, at this time, relay 2FR is retained energized over its normal circuit including front contact *a* of relay 2FC, which is still energized, and back contacts *b* of relay 2FMPS and 2F1A, these latter two relays remaining deenergized under the present conditions. Relay 2FLBP cannot pick up since the release of relay 2FR is necessary to initiate the operation of the timing chain within unit 2FLC. Thus no circuit is completed for relay 2FMPS. Likewise, with back contact *b* of relay 2FR held open, relay 2F1A remains deenergized. As will appear shortly, station coding unit 2FLC holds in its non-operated condition until there is an answer-back from the office location to cause the release of relay 2FR to actually initiate the stepping action of the coding unit.

At the office, absence of the indication tone causes the release of relay OC. The opening of front contact *c* of this relay deenergizes relay KTE which at the end of its slow release period releases to open its front contacts. The opening of front contacts *a* and *b* of relay KTE deenergizes, respectively, relays OTC and OR since front contacts *a* and *b* of relay OC are already open. It is to be noted that the other two alternate circuits for relay OTC are open under the existing conditions. The release of relay OR initiates the first code step in the stepping action by coding unit OLC. The closing of back contact *b* of relay OR also completes the circuit, further including back contacts *f* of relays OM and OLBP, for energizing relay IC1A. This relay picks up, closing its own front contact *a* to complete the stick circuit previously traced. It is to be remembered that this relay is retained energized by this stick circuit until the beginning of the second code step when relay OR picks up to open its back contact *b*.

The release of relay OTC to open its front contact *a* removes the control tone from the communication channel by interrupting the keying circuit for the control tone transmitter. This causes the relays FC at the intermediate stations to and including the active station, that is, the one illustrated in FIG. 2, to release. It is to be noted at this time that relay 1FR at station No. 1 is also deenergized by the opening of front contact *b* of relay OTC to interrupt the direct connection over line wire 13. At the various stations, the release of the relay FC to open its front contact *a* interrupts the existing circuit for the relay FR which likewise releases. At the nonactive stations between the office and the station at which the indication code has been initiated, where relays FM and F1T are not picked up, the coding unit FLC responds to the release of relay FR and locks out under reverse conditions in the usual manner. The same action, of course, will appear at station No. 1 when relay 1FR releases. This reverse lock-out condition is described in the reference Miller patent.

At the active station of FIG. 2, the release of relay 2FR starts the first code step action by unit 2FLC. During this first step, the timing chain is actuated so that relay 2FLBP eventually picks up. Prior to this, the closing of back contact *b* of relay 2FR with back contact *f* of relay 2FLBP closed energizes relay 2F1A. This relay picks up, closing its front contact *a* to bypass back contact *f* of relay 2FLBP and thus provide itself a stick circuit effective until relay 2FR picks up at the beginning of the second code step sometime later. The closing of contact *b* of relay 2F1A in its front position transfers the connection to terminal N for relay 2FR to that provided over front contact *a* of relay 2FTC. Even though unit 2FLC at this station may complete its timing chain operation prior to the completion of the first step at the office location, relay 2FR cannot be reenergized at this time with front contact *a* of relay 2FC still open due to the absence of the control tone on the communication channel.

At the office location, just prior to the completion of the first code step by unit OLC, relay OLBP picks up and holds during the remainder of the coding action. With relay IC1A already picked up, as described, an alternate circuit is now completed for reenergizing relay OTC. This circuit includes back contact *b* of relay O1T, which is inactive during indication codes, front contact *b* of relay OLBP, and front contact *b* of relay IC1A. The closing of front contact *a* of relay OTC obviously recloses the keying circuit and the control tone is restored to the communication channel. The connection to line wire 13 is once again completed over front contact *b* of relay OTC and relay 1FR at station No. 1 is reenergized and picks up. The control tone is received at the stations out to the active station of FIG. 2, where the control circuit remains interrupted with relay 2FMP energized. At that station, the presence of the control tone reenergizes relay 2FC which picks up to close its front contact *a* to prepare a circuit for relay 2FR. This circuit is completed at front contact *a* of relay 2FTC when unit 2FLC completes its timing actions for the first step of the code so that relay 2F1T releases and closes it back contact *b* to reenergize relay 2FTC. The closing of front contacts *b* and *c* of this latter relay restores the indication tone circuit from the more distant stations and this tone is once again transmitted towards the office location. With its circuit completed, relay 2FR is energized and picks up to begin the second indication code step action at this location.

With front contact $g$ of relay 2FLBP already closed, the closing of front contact $a$ of relay 2FR completes the circuit for relay 2FMPS which, thus energized, picks up. A stick circuit including the lower winding of this relay and its own front contact $a$ is thus completed to include front contact $g$ of relay 2FM which is held energized during the entire coding transmission from this station. At the same time, the opening of back contact $b$ of relay 2FR interrupts the stick circuit for relay 2F1A and this relay, thus deenergized, releases immediately. At this time, that is, with the transfer of contact $b$ of relay 2FMPS from its back to front position, the circuit for relay 2FR is transferred over this front contact directly to front contact $a$ of relay 2FTC and thence to terminal N. This station now completes the transmission of this indication code in the usual manner described in the reference Miller patent. During this transmission, relay 2FR is driven in code following operation by the action of front contact $a$ of relay 2FTC which in turn repeats the code pattern established by transmitter relay 2F1T. Relay 2FR thus drives unit 2FLC to advance the coding action in the usual manner, the length of the various code steps being established by relay 2F1T. As will appear shortly, relay 2FC during this code receives an answer-back code from the office location, but its code following operation now has no effect upon the action of the apparatus at this station.

At the office, relay IC1A releases when relay OR picks up since the stick circuit is interrupted at back contact $b$ of relay OR. Relay IC1A releases and remains released during the rest of the reception of the indication code. Relay OTC is thus controlled only by the circuit including front contact $a$ of relay OC so that relay OTC also follows the code pattern received from the field station, retransmitting this over the control tone circuit to all stations to and including the active station of FIG. 2. The alternate open circuit periods thus transmitted retain the intermediate stations between the office and the active station in a locked-out condition. In addition, the retransmission of the code station No. 1 through the periodic interruption of line wire 13 by front contact $b$ of relay OTC retains this station apparatus also locked-out, that is, it prevents it from iniiating an indication code. During the indication code reception, relay OR is driven by the pattern established by front contact $b$ of relay OC, the remainder of this control circuit for the upper winding of relay OR being closed and front contact $b$ of relay KTE remaining open. It is to be noted that the circuit controlling the lower winding of relay OR is open at least at front contact $e$ of relay OM. An indication code is thus received and registered by coding unit OLC in the manner usual in such systems, the functions being registered and displayed in any manner desired.

If the indication code originates at the final station of the system, that is, the station shown in FIG. 3, the general operation as just described for the indication code transmission from an intermediate station is followed with two minor exceptions. Since the control tone circuit terminates at the final station, there is no need for interrupting this circuit to stations more distant from the office. Thus relay 3FMP is not provided with contacts corresponding to contacts $b$ and $c$ of relay 2FMP at the station in FIG. 2. Since the indication tone circuit originates at the final station, the transmission of the various pulses of the indication code including the initial pulse is not through the mode of interrupting the continuity of the indication tone circuit, but rather by a keying circuit direct to the indication tone transmitter. Thus, front contact $b$ of relay 3FTC controls this keying circuit, periodically opening and closing the circuit in accordance with the code pattern to be transmitted. However, the delay periods before the station apparatus can continue its first and second code steps and the answer-back pulses required for synchronization are identical to that already described.

Having thus described the transmission of control and indication codes when each is initiated separately and no other coding action occurs during such period, I shall now discuss the operation of codes which start simultaneously or substantially simultaneously. In many of the prior art systems, answer-back coding from the office location during the reception of indication codes is used to provide priority to a selected code and to assure that station lock-out occurs at locations having a lower priority order. This arrangement assures that the transmission of only one indication code continues when two or more of such codes are simultaneously initiated. However, where considerable transmission delay time occurs, as is assumed in the communication channel of the type here shown, the answer-back coding arrangement cannot be relied upon to assure this separation action under such prior system arrangements. It has been found that the arrangement of the present system may be used where considerable transmission delay time is present to prevent improper and incorrect code reception under conditions of simultaneous code starts. This is one of the more important features claimed for my present invention.

I shall consider first the operation of my system when a second station nearer to the office initiates an indication code after a first station has started the transmission of the initial step of its own indication code. I shall refer to the circuit arrangement shown in FIG. 2 when discussing the operation at each of these stations since the circuit arrangement in this figure is the type installation for all intermediate stations. It will be remembered from the previous description that, when the first station initiates its coding action, the energization of relay FMP at that station actuates the opening of the control tone circuit, the interruption occurring at back contacts $b$ and $c$ of the relay FMP. At all more distant stations, the relay FC releases and in turn deenergizes relay FR. Release of this latter relay actuates a reverse lock-out condition of the corresponding coding unit FLC. These more distant stations remain in this locked-out condition throughout the transmission of such an indication code. It is obvious, then, that the station nearest to the office initiating a code automatically has priority for transmission. At the same time, at the station which first initiates an indication code, the deenergization of relay FTC opens, at its front contacts $b$ and $c$, the indication tone circuit and thus removes the indication tone generated at the final station of the system. This preliminary open circuit pulse is transmitted to the office, arriving at some time later corresponding to the amount of transmission delay between that station and the office location. This line open step, when received at the office and upon the release of relay KTE, actuates the release of relay OTC which opens its front contact $a$ to transmit an open circuit step on the control tone circuit. This initial answer-back code step is, of course, important in advancing the action at the active field station to transmit its indication code.

I shall now assume that a second station nearer to the office starts an indication code prior to the reception of this answer-back line open step on the control circuit. When the code is initiated, relay FMP at this second station picks up, opening the control circuit to the more distant station which includes the one which initially originated an indication code. This open circuit condition is received at the station first initiating an indication code as the answer-back step from the office. If the station apparatus were permitted to respond to this answer-back to continue its coding action, an incorrect code would result since more than one station would be attempting to transmit indication codes simultaneously. Thus, the station transmitting an indication code must receive a second answer-back step from the office, that is, the control tone "ON" step before it may be allowed to continue transmission of its own indication code.

This was described during the indication code description by indicating that relay 2FR at the station of FIG. 2 could not pick up to start a second code step until relay 2FC picked up to close its front contact *a*. This latter action occurs in response to the retransmission of the control tone from the office after an initial first step answer-back of no tone condition. This requirement that the second or tone "ON" answer-back step be received at a station before it may continue its indication coding checks that all stations between that station and the office are inactive, that is, are not transmitting an indication code. The alternate transmission of the open circuit, that is, tone "OFF" steps, as answer-back over the control tone circuit during indication codes holds the inactive stations between the office and the active station locked-out during such coding action. Under the here assumed condition, with a second and closer station initiating its code, the first station fails to receive a second or tone "ON" answer-back step and drops out. Eventually, at the end of the other station's indication code, the first station resets and then reinitiates its indication code and transmits it to the office. In summary, then, the station nearest to the office which simultaneously initiates the transmission of an indication code has priority and will be permitted to continue its coding action as a result of the reception of the second or tone "ON" answer-back from the office.

Another condition requiring synchronization occurs if, after a field station starts an indication code and begins transmission of the preliminary signal portion of the first code step, the office initiates a control code. The office apparatus immediately opens the control tone circuit as a result of the release of relay OTC which is deenergized by the opening of back contact *b* of relay O1T. The active field station, of course, cannot tell whether this open circuit condition is an answer-back to its own code initiation, a control code, or, as previously explained, another station between it and the office initiating an indication code. However, this open circuit condition is timed at the field station in the manner normal to such code systems. If this open circuit condition has a long step characteristic which designates a control code, certain actions of the timing chain relays at the active station establish a code receiving condition in the corresponding unit FLC. This causes the release of relay FM at the station and prepares the unit for reception of the control code. Relay FMP at the active station is released to again complete the control tone circuit to the more distant stations so that the stations may follow and be selected in the usual manner by the station call portion of the control code. Thus, a control code initiated substantially simultaneously with an indication code at any station receives priority and is transmitted, the indication code being stored until the line is again free for its transmission.

It is also evident, from the discussion of the two preceding code separation actions, that the office apparatus must transmit a control tone "ON" character to allow an indicating field station to progress its code to the second step. As was previously discussed, this control tone "ON" character is generated by the energization of relay IC1A, to close its front contact *b* together with, upon completion of the first step timing, the energization of timing chain relay OLBP to close its front contact *b*. This completes the circuit for relay OTC which picks up to close the keying circuit for the control tone transmitter. In the immediately preceding case, where the office apparatus initiated a control code simultaneously with an indication code reception from the field, the opening of back contact *f* of relay OM releases relay IC1A so that the control tone "ON" character cannot be transmitted as an answer-back to the active field station. Rather relay OTC, due to the closing of front contact *b* of relay OM, is placed under the direct control of back contact *b* of relay O1T and proceeds to transmit the control tone which has priority over all indication codes.

One other possible condition must be taken care of in order to assure that the system will operate properly under all occurrences. For example, assume that a field station (FIG. 2) relatively near the office begins an indication code. During this action, when relay 2FMP picks up, the opening of back contacts *b* and *c* of this relay interrupt the control tone transmission to more distant stations. Sometime later, consistent with the transmission delay periods characteristic of the communication channel in use, this open circuit or control tone "OFF" character is received at the last field station (FIG. 3). As a possible example, this may occur as many as six cycles later (60 cycles equal one second). It is further assumed that, simultaneously with the reception of this open circuit character, the final field station initiates an indication code. Relay 3FTC, at its open front contact *b*, interrupts the indication tone transmission. Also, with the release of relay 3FR as a result of the opening of front contact *a* of relay 3FC due to the control tone "OFF" character, unit 3FLC starts its first step of the code. In the one particular system here assumed, the first step of an indication code is about 9 cycles in length.

At the end of this time period, relay 3F1T in coding unit 3FLC releases, closing its back contact *b* to reenergize relay 3FTC. This again completes the keying circuit for the indication tone transmitter and a tone "ON" character is transmitted toward the office. The corresponding time period later, here assumed to be 6 cycles, this indication tone "ON" character is received or arrives at the field station first initiating an indication code. Thus a total time of about 21 cycles has elapsed since this station initiated its indication code. If, when this first station initiated its indication code, an answer-back from the office, that is, a control tone "OFF" character, was immediately received, this first station would close the indication channel at front contacts *b* and *c* of relay 2FTC in about 9 cycles, this, as previously indicated, being the length of an indication code first step. However, at this point in the timing, the indication tone would not be available for transmission to the office since the keying circuit for the tone transmitter at the final station is then open. Thus, the indication code transmission could not be continued beyond the first step since the indication tone "ON" character of the second step could not be transmitted.

This is a principal purpose of adding time element relay KTE at the office. In other words, the action of this relay with its slow release period delays the open circuit or tone "OFF" answer-back on the control tone circuit from the office to the field stations upon initiation of indication codes. In the example here used, a release period of 12 cycles for relay KTE would be proper. Under these conditions, the first station initiating an indication code would not receive the initial or tone "OFF" answer-back step until 12 cycles after it has initiated its code. It will then time the first step of the indication code at about 9 cycles. After a total elapsed time of 21 cycles, that is, 12 plus 9 cycles, this station will start the second code step, closing front contacts *b* and *c* of relay 2FTC at that location to again complete the indication tone circuit from the more distant locations. At this time, of course, the indication tone is available since the final station will have reclosed the keying circuit for the tone transmitter over front contact *b* of relay 3FTC a sufficient period prior to this, consistent with the transmission delay time characteristic of the channel in use, for the tone to have reached the first indicating station. Of course, the continued interruption of the control tone channel at back contacts *b* and *c* of relay 2FMP at the near station causes the final station to then lock-out since it does not have priority for transmitting its indication code, as previously explained. Thus the time delay period provided by relay KTE at the office is established as equal to the round trip transmission delay time, characteristic of the communication channel in use, between the nearest field station and the most distant field station.

It is obvious that transmission of indication codes from the direct wire connected station No. 1 will also be synchronized with transmission of codes from other stations. This occurs through the action of relay S1K which, upon the reception of the initial code step from station No. 1, is energized due to the closing of back contact *d* of relay FTP. Relay S1K is held energized during the remainder of the reception of that indication code and, at its back contact *b*, interrupts the keying circuit for the control tone transmitter. This tone "OFF" condition transmitted to all other field stations holds such stations in their locked-out condition, unable to initiate any indication code. Since the interruption of the control tone under these conditions occurs at the office, transmission of indication codes from station No. 1 has priority over codes from any other station. However, as was previously described, once an indication code has been properly started and advanced to the second step at other stations, the corresponding code following operation of relay OTC at the office, to transmit answer-back code steps, holds relay 1FR at station No. 1 active so that coding unit 1FLC at this location cannot initiate a code until the completion of the other indication codes.

The system of my invention thus provides an economical and relatively simple arrangement for proper operation of a remote control system over a carrier communication channel having considerable transmission delay periods. This operation is provided by restricting the progress of indication codes initiated at any field station. Only upon reception of the proper answer-back code steps from the office is the station apparatus allowed to progress to the first and to the second steps of the indication codes. Synchronization of the system operation in the event of substantially simultaneously initiated codes is also provided. The time element provided at the office allows synchronization even if a code is initiated at a more distant station, after a similar code is initiated at a near station, at a time interval spaced the amount of transmssion delay time occurring in the communication channel between those stations. Correct system operation, synchronized action, and proper code reception thus result regardless of the delay periods which may be inherent in the basic communication channel over which the control and indication tones for the remote control system are transmitted.

Although I have herein shown and described but one form of a carrier-current remote system embodying the arrangement of my invention, it is to be understood that various modifications and changes may be made therein within the scope of the appended claims without departing from the spirit and scope of my invention.

Having thus described my invention, what I claim is:

1. In a remote control system including a control office and a plurality of stations connected by a communication channel, each location being provided with apparatus for transmitting and receiving code signals over said communication channel to and from other locations, each location being adapted to independently initiate such codes; transmission delay compensation apparatus comprising in combination;

(a) circuit means at each station having connections for delaying the transmission of an initiated code by said transmitting apparatus after the transmission of a preliminary signal, (b) timing means at said office responsive to said preliminary signal for measuring a first predetermined timing period, (c) a first circuit means at said office controlled by said timing means and also responsive to said preliminary signal for actuating said office apparatus when said first timing period has elapsed to transmit a first answer-back signal and to measure a second predetermined timing period, (d) a second circuit means controlled by said office apparatus for actuating the transmission of a second answer-back signal upon completion of said second timing period, (e) said station circuit means being responsive to said first answer-back signal and having connections for driving the station apparatus to continue the transmission of the initiated code beyond said preliminary signal only if said first answer-back signal is received at that station, (1) said station circuit means controlling the station apparatus to halt the code transmission at the end of a first portion thereof until said second answer-back signal is received.

2. In a remote control system including a control office and a plurality of remote stations, a carrier current circuit in each direction connecting said office and stations, a code transmitter-receiver at each location for controlling the transmission codes of control and indication functions over said carrier circuits between said office and said station; the combination comprising:

(a) start means at each station controlling the station code transmitter-receiver for initiating the transmission of an indication code, (b) a circuit means at each station with connections to said code transmitter-receiver for halting the transmission of an indication code initiated by said start means after the transmitting of only a preliminary signal, (c) a timing means at said office responsive to the reception of said preliminary signal for initiating a coding action by the office code transmitter-receiver at the termination of a selected time period, (d) a carrier control means controlled by said timing means for transmitting a first answer-back signal to said stations at the expiration of said selected time period, (e) said carrier control means being further controlled by said office code transmitter-receiver for transmitting a second answer-back signal at the end of a first code period of said transmitter-receiver, (f) receiving means at each station responsive to said first answer-back signal and having connections for driving the station transmitter-receiver through its first code period only when the corresponding start means has initiated an indication code, (g) each said station receiving means being responsive to said second answer-back signal, if the associated transmitter-receiver has completed its first code period, for enabling that transmitter-receiver to complete the initiated indication code independent of any further answer-back signals.

3. In a remote control system including a control office and a plurality of remote stations, a carrier current circuit in each direction connecting said office and locations, a code transmitter-receiver at each location for controlling the transmission codes of control and indication functions over said carrier circuits between said office and stations; the combination comprising:

(a) start means at each station controlling the station code transmitter-receiver for initiating the transmission of an indication code, (b) means at each station responsive to the initiation of an indication code for actuating the transmission of a preliminary signal, (c) a circuit means at each station with connections to said code transmitter-receiver for halting the transmission of an indication code initiated by said start means after the transmission of only said preliminary signal, (d) a timing means at said office for measuring a preselected time period when actuated, (1) circuit means responsive to the reception of said preliminary signal at said office for actuating said timing means, (2) said timing means having connections for initiating a coding action by the office transmitter-receiver upon completion of said time period, (e) a carrier current control means controlled by said timing means for transmitting a first answer-back signal to said stations at the expiration of said selected time period, (f) said carrier circuit control means being further controlled by said office code transmitter-receiver for transmitting a second answer-back signal at the end of a first coding period of said transmitter-receiver, (g) a carrier current receiving means at each station responsive to said first answer-back signal and having connections for driving the station transmitter-receiver to its first coding period only when the corresponding start means has initiated an indication code, (1) said receiving means being responsive to said second answer-back signal for driving said station transmitter-receiver to its second coding period, (h) a transfer means at each station for completing when actuated a self driving circuit means for the station transmitter-receiver, (i) an actuating circuit for said station transfer means completed in joint response to the initiation of an indication code transmission, the reception of said second answer-back signal, and the completion of said first coding period by said station transmitter-receiver.

4. In a remote control system including a control office and a plurality of remote stations, a carrier current circuit in each direction connecting said office and stations, a code transmitter-receiver at each location for controlling the transmission codes of control and indication functions over said carrier circuits between said office and said stations; the combination comprising:

(a) start means at each station controlling the station code transmitter-receiver for initiating the transmission of an indication code, (b) means at each station responsive to the initiation of an indication code for actuating the transmission of a preliminary signal to said office, (c) a timing means at said office controlled by the reception of said preliminary signal for measuring a preselected time interval, (1) said timing means having connections for initiating a coding action by the office transmitter-receiver at the expiration of said preselected time interval, (d) a carrier circuit control means controlled by said timing means for transmitting a first answer-back signal to said stations at the expiration of said selected time interval, (1) said carrier circuit control means being further controlled by said office code transmitter-receiver for transmitting a second answer-back signal at the end of a first coding period of said transmitter-receiver, (e) a driving means at each station with connections to the station transmitter-receiver for advancing the coding action of that transmitter-receiver when said driving means is periodically actuated, (1) said driving means halting the coding action after the transmission of said preliminary signal until initially actuated, (f) a receiving means at each station having connections to said control carrier circuit and responsive to the answer-back signals, (g) a first control circuit means at each station controlled by said receiving means and having connections at times for actuating said driving means to drive the station transmitter-receiver to a first and a second coding period in response to said first and said second answer-back signals respectively, (h) a second control circuit means at each station controlled by the station transmitter-receiver and at times having connections for periodically actuating said driving means, (i) a transfer means at each station controlled by said receiving means, said station transmitter-receiver, and said start means for transferring the driving means from the first circuit connections to the second circuit connections at the end of the first coding period only if said second answer-back signal is received and an indication code was previously initiated.

5. In a remote control system including a control office and a plurality of stations connected by a communication channel adapted for transmission in each direction of series of code signals carrying functions, each location having code apparatus to generate such series of code signals; the combination comprising:

(a) a master relay at each station energized for initiating code transmissions, (1) said master relay having connections to said channel for disconnecting the more distant stations, (b) transmitting means at each station controlled by said master relay when energized for transmitting a preliminary signal only, (c) a receiving means at each location with connections to said channel for receiving signals from at least one other location, (d) a timing relay at said office adapted when actuated to provide a predetermined time period equal to twice the channel transmission delay time between the first and the final stations of said system, (1) an actuating circuit controlled by the office receiving means for actuating said timing relay when said preliminary signal is received, (e) a control means controlled by said office receiving means for driving the office code apparatus to register code signals from said stations, (1) said control means also controlled by said timing relay for delaying the registry of said preliminary signal to initiate a registry action until the expiration of said predetermined time period, (f) a signal transmitting means at said office having connections to said channel and controlled by said office receiving means and said timing relay for transmitting a first answer-back signal at the end of said predetermined time period, (g) control means for each station apparatus controlled by that station receiving means for initiating coding action only when said first answer-back signal is received, (h) a second control circuit for said office transmitting means responsive to the completion of an initial stepping action of said office apparatus for actuating the transmission of a second answer-back signal, (i) a transfer relay at each station having connections for transferring the control of that station apparatus control means to actuate continued code transmission regardless to answer-back signals, (1) a control circuit controlled by the corresponding master relay in its energized condition and by that station receiving means when said second answer-back signal is received for actuating said transfer relay to complete the control transfer.

6. In a remote control system including a control office and a plurality of stations connected by a communication channel adapted for transmission in each direction of series of code signals carrying functions, each location having code apparatus to generate such series of code signals; the combination comprising:

(a) a master relay at each station energized for initiating code transmissions, (1) said master relay having connections to said channel for disconnecting the more distant stations, (b) transmitting means at each station having connections to said channel and controlled by said master relay when energized for transmitting a preliminary signal only, (c) a receiving means at said office with connections to said channel for receiving signals from each of said stations, (d) a timing relay at said office adapted when actuated to provide a predetermined time period equal to twice the channel transmission delay time between the first and the final stations of said system, (1) an actuating circuit controlled by said office receiving means for actuating said timing relay when said preliminary signal is received, (e) a control means controlled by said office receiving means for driving the office code apparatus to register code signals from said stations, (1) said control means also controlled by said timing relay for delaying the registry of said preliminary signal to initiate a registry action until the expiration of said predetermined time period, (f) a signal transmitting means at said office having connections to said channel and controlled by said office receiving means and said timing relay for transmitting a first answer-back signal at the end of said predetermined time period, (g) a receiving means at each station with connections to said channel for receiving signals only from said office, (h) control means for each station apparatus controlled by that station receiving means for initiating a first coding period only when said first answer-back signal is received, (i) a second control circuit for said office transmitting means responsive to the completion of an initial stepping action of said office apparatus for actuating the transmission of a second answer-back signal, (j) a transfer relay at each station having connections for transferring the control of that station apparatus control means to actuate continued code transmission regardless of answer-back signals, (1) a control circuit completed by the corresponding master relay in its energized condition, by that station apparatus at the end of the first coding period, and by that station receiving means when said second answer-back signal is received for actuating said transfer relay to complete the control transfer.

No references cited.

NEIL C. READ, *Primary Examiner.*

H. I. PITTS, *Assistant Examiner.*